United States Patent [19]

Dunne et al.

[11] Patent Number: 5,149,960
[45] Date of Patent: Sep. 22, 1992

[54] METHOD OF CONVERTING SCANNER SIGNALS INTO COLORIMETRIC SIGNALS

[75] Inventors: Bruce Dunne, Westmont, Ill.; Thomas G. Stockham, Jr., Salt Lake City, Utah

[73] Assignee: R. R. Donnelley & Sons Company, Lisle, Ill.

[21] Appl. No.: 725,657

[22] Filed: Jul. 3, 1991

[51] Int. Cl.⁵ ............................................. G01J 3/46
[52] U.S. Cl. ..................................... 250/226; 356/402
[58] Field of Search ............... 250/226; 356/402; 358/80

[56] References Cited

U.S. PATENT DOCUMENTS

| | | | |
|---|---|---|---|
| 3,600,042 | 8/1971 | Yukio | 250/226 |
| 4,060,829 | 11/1977 | Sakamoto | 358/80 |
| 4,402,007 | 8/1983 | Yamada | 358/75 |
| 4,414,635 | 11/1983 | Gast et al. | 364/526 |
| 4,477,833 | 10/1984 | Clark et al. | 358/80 |
| 4,481,532 | 11/1984 | Clark et al. | 358/80 |
| 4,500,919 | 2/1985 | Schreiber | 358/78 |
| 4,584,601 | 4/1986 | Suzuki et al. | 358/80 |
| 4,648,051 | 3/1987 | Wandell et al. | 364/526 |
| 4,710,806 | 12/1987 | Iwai et al. | 358/81 |
| 4,727,425 | 2/1988 | Mayne et al. | 358/80 |
| 4,819,193 | 4/1989 | Imao | 364/526 |
| 4,823,185 | 4/1989 | Miyamoto et al. | 250/226 |
| 4,833,533 | 5/1989 | Augusti et al. | 358/80 |
| 4,860,059 | 8/1989 | Terashita | 355/38 |
| 4,884,221 | 11/1989 | Sugiyama et al. | 364/526 |
| 4,901,254 | 2/1990 | Dolezalek et al. | 250/226 |
| 4,916,531 | 4/1990 | Genz et al. | 358/75 |
| 4,941,039 | 7/1990 | E'Errico | 358/80 |
| 4,961,646 | 10/1990 | Schrammli et al. | 356/328 |
| 4,975,768 | 12/1990 | Takaraga | 358/75 |
| 5,003,500 | 3/1991 | Gerber | 356/402 |

*Primary Examiner*—David C. Nelms
*Assistant Examiner*—Kiet T. Nguyen
*Attorney, Agent, or Firm*—Marshall, O'Toole, Gerstein, Murray & Bicknell

[57] ABSTRACT

A method of developing a set of colorant signals representing substantially exact amounts of colorants required to reproduce a color in a medium includes the steps of using a scanner to develop a first set of scanner signals, processing the set of scanner signals in an iterative conversion loop and selecting a set of colorant estimates developed by the iterative conversion loop that meets a solution criterion as the set of colorant signals. The colorant signals may thereafter be converted to colorimetric data by a converter.

29 Claims, 7 Drawing Sheets

METHOD OF CONVERTING SCANNER SIGNALS INTO COLORIMETRIC SIGNALS

TECHNICAL FIELD

The present invention relates generally to color reproduction, and more particularly to a method of converting color scanner signals into colorimetric signals.

BACKGROUND ART

In order to reproduce a color original, it is necessary to determine, for each pixel of the original, the components of the pixel color and to thereafter determine the amounts of colorants required to reproduce the pixel color. The most common way of determining these amounts is through the use of a scanning densitometer. A densitometer scans a color transparency pixel by pixel and develops a signal triplet representing the approximate densities of the red, green and blue color components forming the color of each pixel. However, scanning densitometers have inherent limitations which limit the usefulness thereof. The most noticeable limitation is due to the fact that the density spectra of the transparency colorants overlap each other resulting in unwanted densities and crosstalk between densitometer color channels. This crosstalk is unavoidable and must be compensated for to achieve true color reproduction. If the filter bandwidths are very narrow, a $3 \times 3$ matrix can remove the crosstalk to obtain true colorant values. Unfortunately, the filters used in ordinary densitometers are not ideal inasmuch as each has a bandwidth which is insufficiently narrow and as a result nonlinearities arise in the relationship between densitometer outputs and colorant values. This nonlinear relationship results in the inability of the matrix to precisely determine the amounts of colorants forming a pixel color from the densitometer outputs for all colorant combinations. Hence, the resultant colorant values do not permit completely satisfactory color reproduction.

A different method of correcting densitometer output signals to eliminate unwanted densities involves the use of a lookup table (LUT) stored with empirically determined data. For example, Clark, et al., U.S. Pat. Nos. 4,477,833 and 4,481,532, owned by the assignee of the instant application, disclose color reproduction systems utilizing a method of storing empirically derived values in a lookup table and a method of interpolating between such stored values. The lookup table is addressed by scanned RGB density values to obtain cyan, magenta and yellow (CMY) density values suitable for an output device.

While color reproduction using a densitometer has been found to be advantageous in that the measurements relate a color to the amount of colorants required to reproduce the color and while years of experience have been gained through the use of densitometers, it has been found that the ability to soft proof (i.e., reproduce the color on different media, such as a CRT) is limited and modification and correction must be done empirically.

The use of a colorimeter (i.e., a device which develops a triplet of numbers X, Y, Z formed by integrating over a spectral response that matches the response defined by the CIE Commission of 1931 for the two degree or the ten degree observer) to obtain values in a colorimetric space allows color correction and soft proofing to be accomplished in an easier fashion. Also, many image processing, manipulation, gamut translation and achromatic processing tasks are more readily accomplished. Further, the colorimetric color space is related to the average human observer, and hence colors are defined in a visually precise manner. However, not as much experience has been gained in the practicality and use of a colorimeter as compared with a densitomer.

The traditional way to scan colorimetrically involves replacing the spectral response elements including the red, green and blue filters of the densitometric scanner with spectral response elements including filters that closely approximate the broadband colorimetric response curves or some linear combination of such curves. The resulting data developed by such a scanner is colorimetric in nature, i.e., the signals define a color in a colorimetric space. However, in order to accomplish this, a greatly-modified scanner must be built, which is potentially a difficult task and costly.

A further color reproduction system is disclosed in Schreiber, U.S. Pat. No. 4,500,919. A scanner is used to scan a color original on a pixel-by-pixel basis and tristimulus appearance values are developed representing the colors of the pixels. If the scanner is not equipped with true color matching function filters (i.e., colorimetric filters) then a converter is required to convert the scanner outputs into tristimulus appearance signals. In this case, if the deviation from the correct filter characteristics is small, then the conversion is done by means of a $3 \times 3$ linear matrix. On the other hand, if the deviation from the correct filter characteristics is very large, a lookup table is used to convert the scanner outputs to tristimulus appearance values.

Schreiber also discloses methods of loading a lookup table. However, the Schreiber methods, like all other methods that load lookup tables using empirically determined values, must derive all entries for the table experimentally and substantially simultaneously. Also, according to one of the methods disclosed by Schreiber, all of the entries in the table must be manipulated in an iterative process as a set. Further, the Schreiber methods begin with a first rough guess at table entries and then adjust table entries to successively correct same.

SUMMARY OF THE INVENTION

In accordance with the present invention, given that a color is composed of a combination of colorants (such as a film pixel composed of a combination of dyes), a method is proposed in which a scanning densitometer or other photosensitive device is used to measure a color and thereafter substantially exact colorant values are determined.

More particularly, in accordance with one embodiment of the present invention, a method of developing a set of colorant signals representing substantially exact amounts of colorants required to reproduce a color in a medium includes the step of using a photosensitive device, such as a scanner or a densitometer, to develop a first set of color definition signals defining the color in terms of amounts of color components according to a transformation function. The method includes the further step of processing the set of color definition signals in an iterative correction loop wherein the loop develops a succession of sets of colorant estimates that converge toward the required exact amounts of colorants. A set of colorant estimates that meets a solution criterion is selected as the set of colorant signals.

Preferably, the step of processing includes the step of deriving a first set of colorant estimates from the first set of color definition signals and incrementing the first set of colorant estimates in accordance with a succession of sets of error values to obtain further sets of colorant estimates.

In accordance with one aspect of this embodiment, the step of deriving includes the step of modifying the first set of color definition signals in accordance with a matrix to obtain the first set of colorant estimates.

Also, the step of incrementing preferably includes the further steps of converting each set of colorant estimates into a set of estimated color definition signals according to the transformation function and subtracting each set of estimated color definition signals from the first set of color definition signals to obtain the succession of sets of error values. The succession of sets of error values are converted into successive sets of incremental colorant values which are in turn added to the first set of colorant values to obtain the sets of colorant estimates.

Further, the step of converting preferably includes the step of modifying the succession of sets of error values in accordance with the matrix to obtain the successive sets of incremental color values.

Still further in accordance with this embodiment, each set of colorant estimates represents an associated color and the step of converting includes the steps of passing each set of colorant estimates to a first simulation module which converts each set of colorant estimates into density spectrum values representing the associated color in accordance with the spectral distribution of the colorants and a second simulation module which simulates scanning of the simulated reconstruction of the associated color by the densitometer to derive the estimated color definition signals.

The method may include the further step of developing color data in a particular color space, such as the X, Y, Z space, from the density spectrum values obtained by conversion of the selected set of colorant estimates. If desired, the colorimetric data may be stored in a lookup table to permit fast conversion of subsequently developed scanner outputs to colorimetric data and/or the selected set of colorant estimates may be stored in a lookup table.

In accordance with a further embodiment of the present invention, a method of converting a set of scanner signals produced by a scanner into a set of colorant signals wherein the scanner signals represent approximate densities of components of a color formed by a colorant on a medium includes the steps of modifying the set of scanner signals a first time to obtain a first set of colorant estimates, simulating reproduction of the color on the medium using the first set of colorant estimates and simulating scanning of the simulated reproduced color by the scanner to obtain a first set of estimated color definition signals. The method includes the further steps of comparing the first set of estimated color definition signals with the set of scanner signals to obtain a set of error signals, modifying the set of error signals to obtain a corrected set of error signals and summing the set of error signals with the first set of colorant estimates to derive the set of colorant signals.

In accordance with yet another embodiment of the present invention, a method of converting color density data into colorimetric data wherein the color density data represent approximate densities of color components of a color formed by colorants on a medium and wherein the colorants have known spectral densities when applied to the medium includes the steps of correcting the color density data in an iterative fashion to obtain a set of colorant data representing amounts of each colorant forming the color on the medium and converting the set of colorant data into colorimetric data using data representing the known spectral densities of the colorants, spectral content of an illumination source and color matching functions.

The method of the present invention uses analytic rather than empirical modeling. Further, colorimetric data is obtained without the need to modify a scanner or employ expensive colorimetric filters.

DESCRIPTION OF THE PREFERRED EMBODIMENTS

Figure 1:
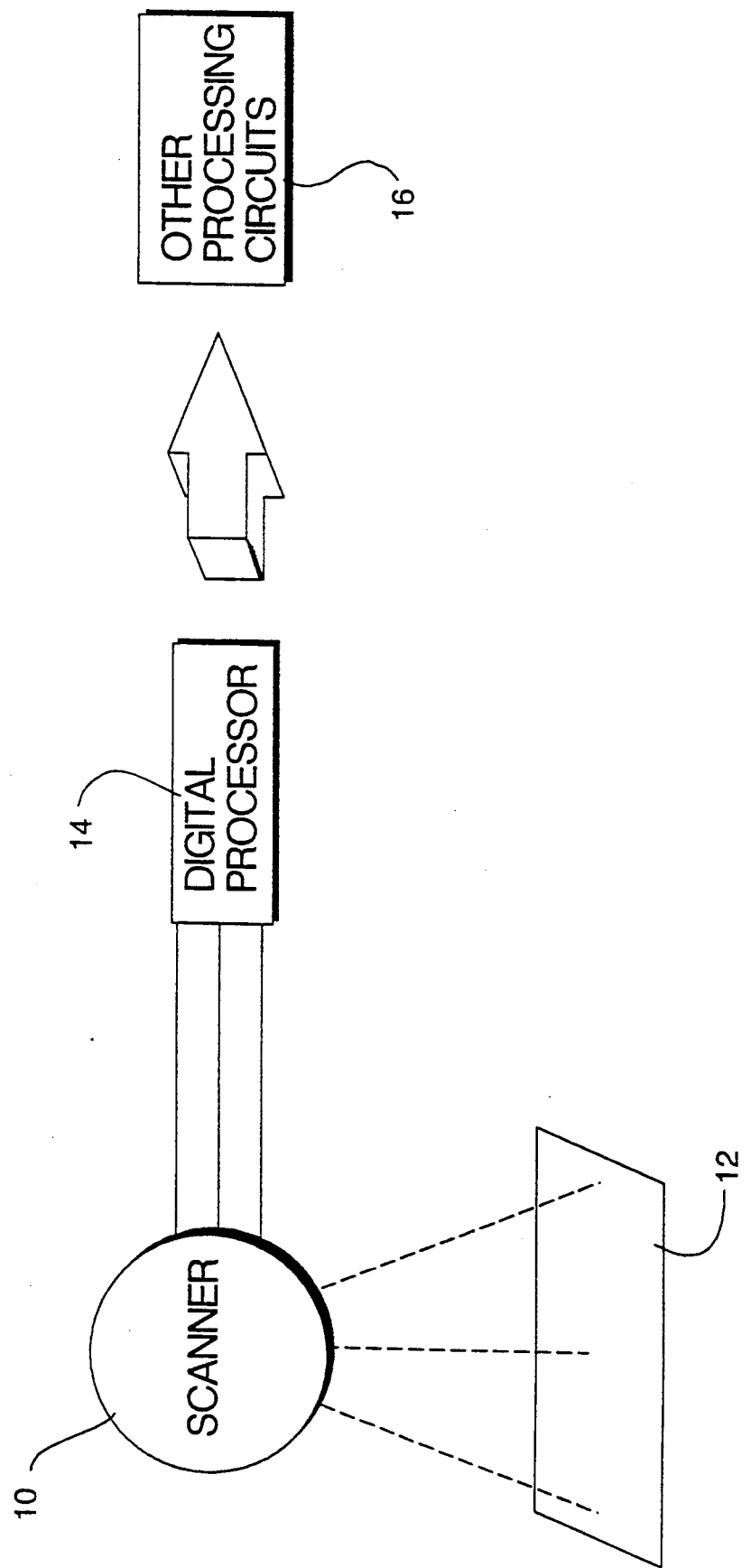
FIG. 1 comprises a generalized block diagram of a system implementing the method of the present invention.

Referring now to FIG. 1, a photosensitive device in the form of a scanner 10, which may comprise a densitometer, scans a color original 12 on a pixel-by-pixel basis and develops scanner densitometric output signals representing the color components of each pixel color. Preferably, the color original is formed by a combination of colorants on a medium, such as transparency film stock. The scanner signals are provided to a digital processor 14 which may comprise a computer and which in turn develops colorimetric signals or data. These data may be provided to other circuitry, such as an output device or other processing circuits 16.

As is well known, film positives produced on transparencies contain cyan, magenta and yellow dye layers immersed in an emulsion carried by a substrate. It is the amounts of these dyes in spatially varying combinations that make up the image of the color original. If the spectral density distributions of these dyes are known for a particular film type, and if the dyes obey the additivity and proportionality rules, then the colorimetric values of each pixel can be found from the output of the scanner 10. This is made possible by first eliminating the crosstalk from the outputs of the scanner. If the scanner spectral transfer function (or "bandpass") were infinitesimally narrow for each channel, the relationship between densitometer outputs and dye densities would be linear and the crosstalk could be removed simply by multiplying the scanner output triplet by a 3×3 matrix described in greater detail hereinafter. However, since practically all densitometers have bandpass widths which are not infinitesimally narrow, the relationship between densitometer outputs and dye densities is nonlinear and, as a result, a 3×3 matrix alone is insufficient to eliminate crosstalk. Instead, as noted in greater detail hereinafter, an iterative successive approximation procedure is used to eliminate crosstalk and the nonlinearities between scanner outputs and colorant values. From the dye layer densities (C, M, Y) produced by the successive approximation procedure the density spectrum $D(\lambda)$ for each pixel is found from the equation:

$$D(\lambda) = CC_U(\lambda) + MM_U(\lambda) + YY_U(\lambda) \quad (1)$$

where $C_U(\lambda)$, $M_U(\lambda)$, and $Y_U(\lambda)$ are the known spectral density distributions of the film dyes. The transmittance spectrum $T(\lambda)$ is then found from $D(\lambda)$ using Beer's Law:

$$T(\lambda) = 10^{-D(\lambda)} \quad (2)$$

and integration over $T(\lambda)$ using the weights $\bar{x}(\lambda)$, $\bar{y}(\lambda)$ and $\bar{z}(\lambda)$ yields the XYZ colorimetric data. Alternatively, a different set of color matching functions may be used as weights to yield colorimetric data in an alterative color space.

Figure 2:
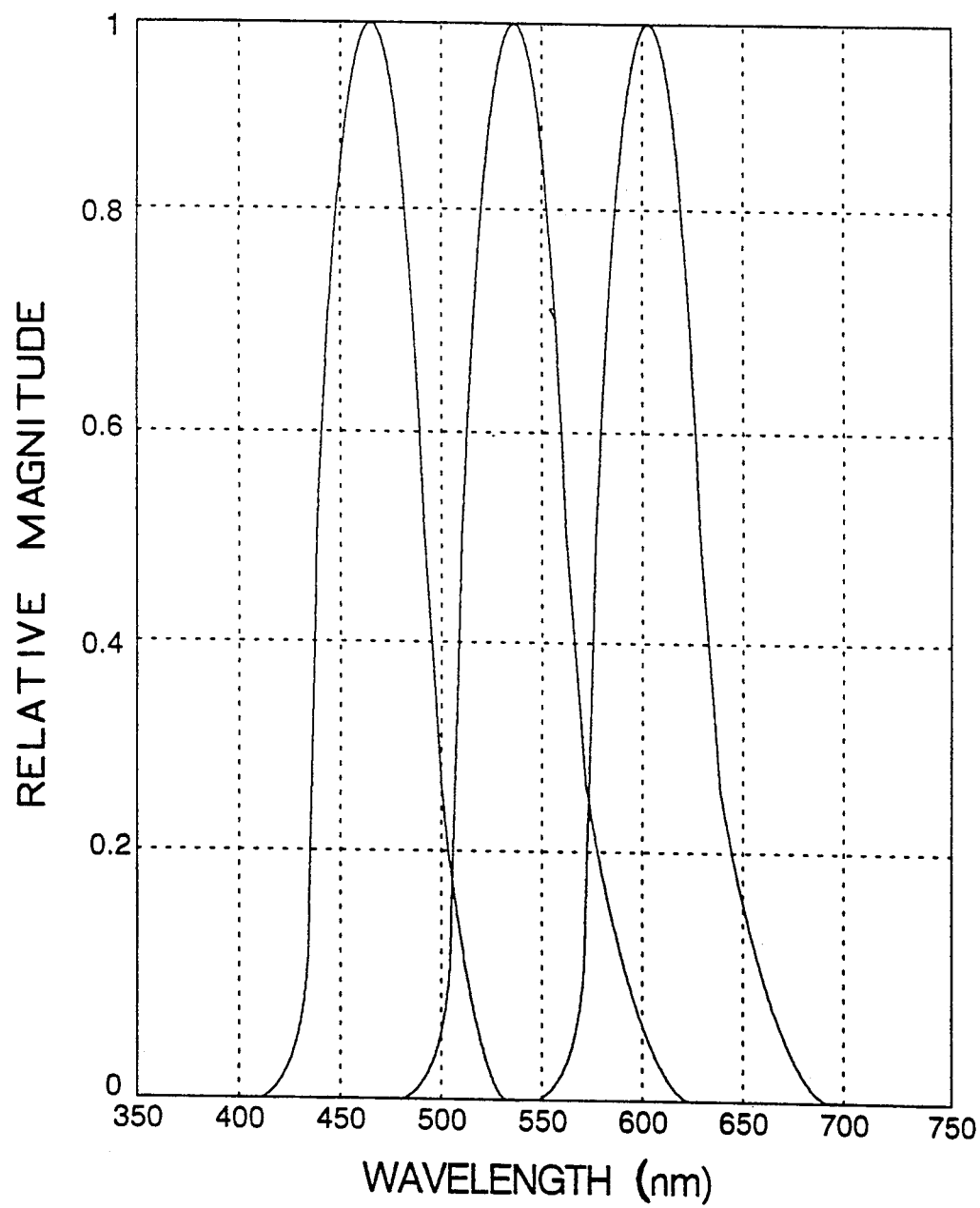
FIG. 2 comprises a series of curves illustrating the bandpass characteristics of the scanner of FIG. 1.

In order to eliminate unwanted densities, the scanner bandpass must be known. The scanner bandpass is determined by commercially available measuring devices using techniques well known to one of ordinary skill in the art and/or by using data provided by the scanner manufacturer concerning the optical characteristics of one or more components thereof. A set of curves illustrating the scanner channel bandpasses is shown in FIG. 2.

Figure 4:
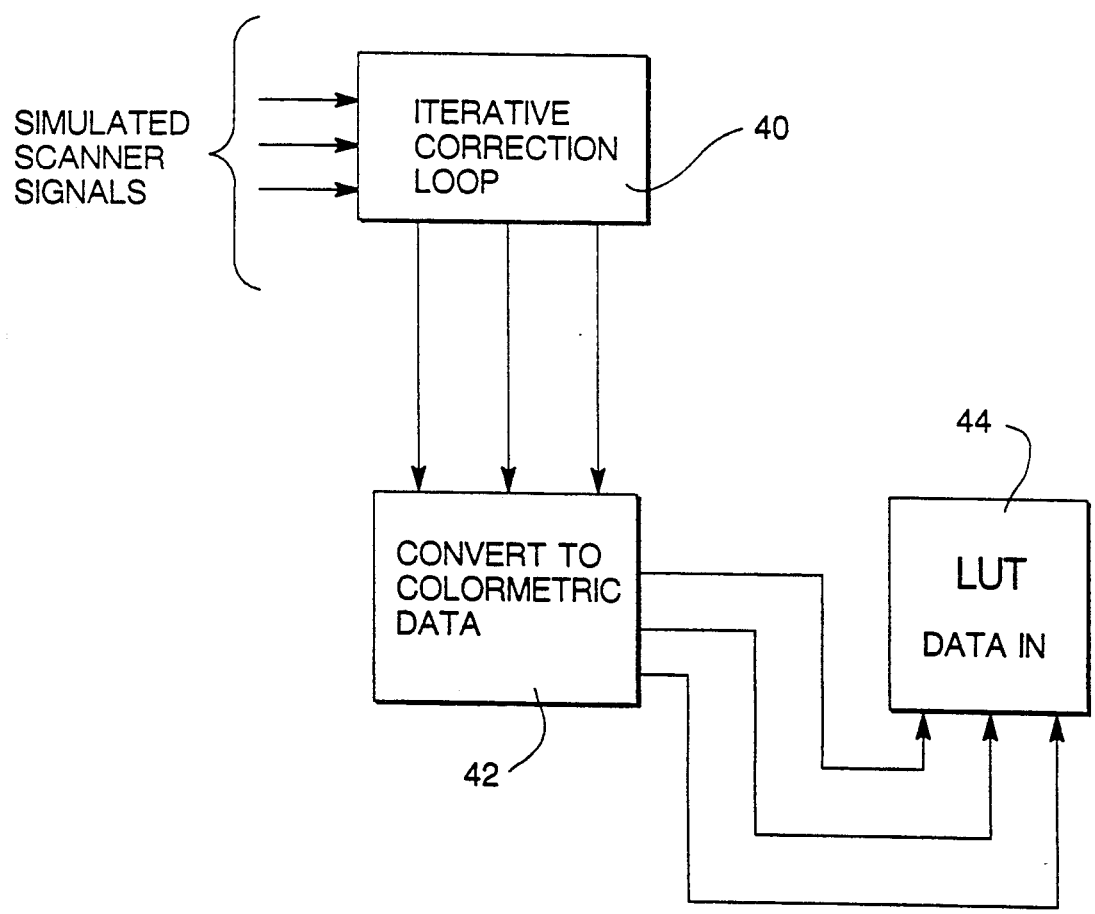
FIG. 4 comprises a block diagram of a system for loading a lookup table (LUT) with colorimetric data.

Referring now to FIG. 4, once the bandpass response of the scanner 10 is determined, this knowledge can be used to develop an iterative correction loop 40 which may be used together with simulated scanner signals representing a plurality of simulated color patches to permit the generation of density spectrum values. The density spectrum values are then provided to a converter 42 which converts same into colorimetric data. These data may then be stored in a LUT 44 at addresses corresponding to the simulated scanner signals.

While in the preferred embodiment, the LUT 44 is loaded using simulated scanner signals, it should be noted that the LUT may instead be loaded by using a scanner to scan a plurality of actual patches, if desired.

In a specific application of the system illustrated in FIG. 4, the LUT 44 comprises a memory having three dimensional input addresses wherein each dimension has seventeen steps. Simulated scanner signals ranging from 0 to 4.0 density units in increments of 0.25 density units in all three dimensions are processed by the iterative correction loop and the resulting values are converted to colorimetric data and are stored in the LUT 44. It should be noted that a LUT of a different size may be used, if desired.

Figure 5:
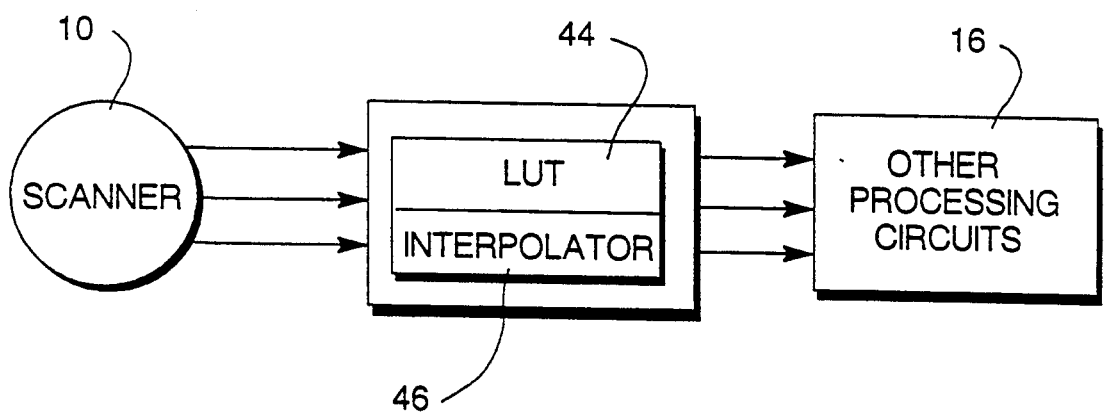
FIG. 5 comprises a block diagram illustrating a system utilizing the LUT of FIG. 4 to convert scanner output signals into colorimetric data.

Referring now to FIG. 5, once the LUT 44 is loaded, it may be used together with an interpolator 46 to convert scanner signals developed by the scanner 10 into colorimetric data that may be supplied to the output device or other processing circuits 16.

Figure 6:
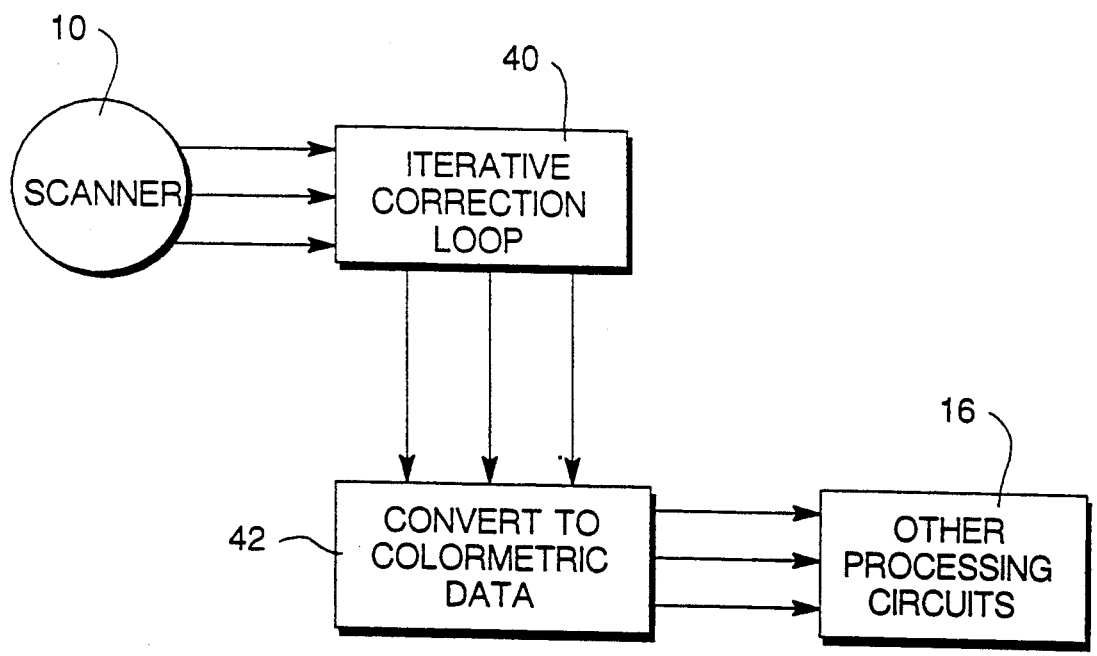
FIG. 6 comprises a block diagram of an alternative system for converting scanner output signals into colorimetric data without the use of a LUT.

Alternatively, as seen in FIG. 6, the densitometer 10, the iterative correction loop 40 and the converter 42 may be used to convert an image into colorimetric data on a pixel-by-pixel basis without the use of a LUT.

Figure 7:
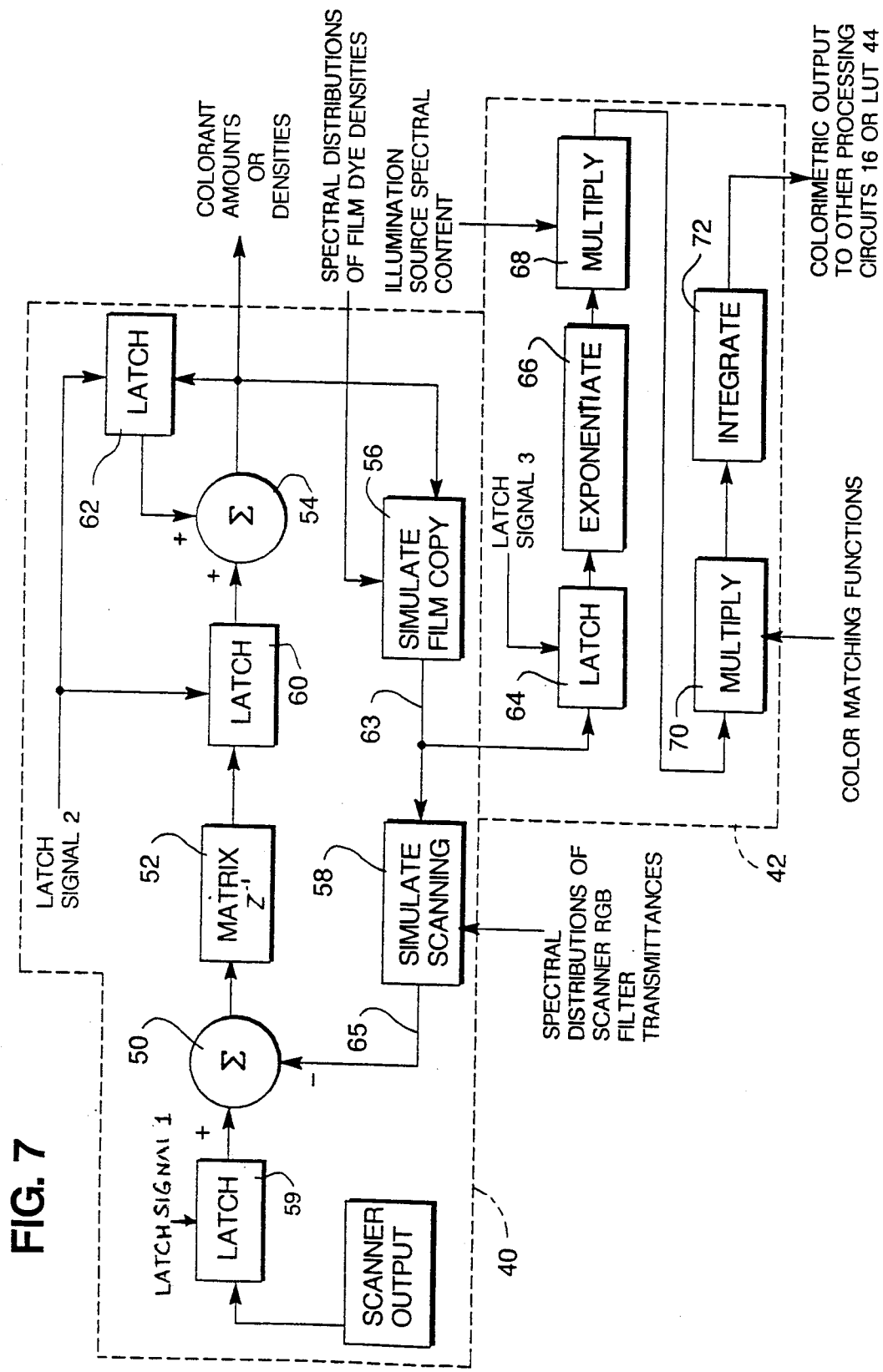
FIG. 7 comprises a block diagram illustrating programming executed by the digital processor of FIG. 1 to implement the method of the present invention.

FIG. 7 illustrates the iterative correction loop 40 and converter 42 in greater detail. As noted above, the blocks 40 and 42 may be implemented by the special purpose digital processor 14 or by suitably programming a computer. Also, it may prove necessary or desirable to convert the digital output of the scanner into density values prior to processing by the iterative correction loop 40. The iterative correction loop 40 includes a first summer 50, a correction matrix 52, a second summer 54, a first simulation module 56 and a second simulation module 58. In addition, latches 59, 60 and 62 are operated in accordance with latch signals LATCH1 and LATCH2 to control the flow of data through the loop. While the blocks 50, 52, 54, 56, 59, 60 and 62 are shown as being interconnected by single lines, it should be noted that each of these blocks processes the red, green and blue scanner output signals as a triplet. As noted in greater detail hereinafter, the module 56 develops a signal on a single line 63 representing a density spectrum vector and such signal is supplied to the second simulation module 58 and also to a further latch 64. The second simulation module 58 converts the signal on the line 63 to a signal triplet on lines 65 which are compared with signals developed by the latch 59, as noted in greater detail hereinafter.

As noted previously, the loop 40 operates on an iterative basis. During the first pass through the loop, a first set of scanner color definition signals developed by the scanner 10 defining the color of the pixel currently being scanned in terms of red, green and blue color components is latched by the latch 59 and passed to a noninverting input of the summer 50. During this pass, the magnitude of each of a triplet of signals supplied to an inverting input of the summer 50 is zero. The unmodified color definition signals are passed to the matrix 52 (also referred to $Z^{-1}$ or Z inverse) which converts the color definition signals into a first set of colorant estimates $C_1$, $M_1$, $Y_1$ representing a first estimate of cyan, magenta and yellow dyes which, if applied to transparency film would roughly approximate the color of the pixel. The matrix 52 is derived by simulating color patches that have unit quantities of a single dye and simulating scanning of the patches. More particularly, first through third signal triplets are provided to the first simulation module 56. The first signal triplet represents a unit amount of cyan dye and zero amounts of magenta and yellow dyes. The second signal triplet comprises signals representing zero amounts of cyan and yellow dyes and a unit amount of magenta dye while the third signal triplet comprises signals representing a unit amount of yellow dye and zero amounts of cyan and magenta dyes. As before, these simulated patches may be replaced by actual patches which are scanned to produce three signal triplets. Each triplet is processed by the first simulation module 56 to obtain a signal representing the density spectrum of the color defined by the associated triplet. Each signal on the line 63 is processed by the second simulation circuit to simulate scanning thereof by the scanner 10. A set of three density signals are obtained on the lines 65 for each triplet provided to the module 56. The second simulation module 58 thus produces nine channel outputs as follows:

$$D_{rc} = -\log\left(\frac{\int S_r(\lambda) 10^{-C_U(\lambda)} d\lambda}{\int S_r(\lambda) d\lambda}\right) \quad (3a)$$

$$D_{gc} = -\log\left(\frac{\int S_g(\lambda) \, 10^{-C_U(\lambda)} \, d\lambda}{\int S_g(\lambda) \, d\lambda}\right) \quad (3b)$$

$$D_{bc} = -\log\left(\frac{\int S_b(\lambda) \, 10^{-C_U(\lambda)} \, d\lambda}{\int S_b(\lambda) \, d\lambda}\right) \quad (3c)$$

$$D_{rm} = -\log\left(\frac{\int S_r(\lambda) \, 10^{-M_U(\lambda)} \, d\lambda}{\int S_r(\lambda) \, d\lambda}\right) \quad (3d)$$

$$D_{gm} = -\log\left(\frac{\int S_g(\lambda) \, 10^{-M_U(\lambda)} \, d\lambda}{\int S_g(\lambda) \, d\lambda}\right) \quad (3e)$$

$$D_{bm} = -\log\left(\frac{\int S_b(\lambda) \, 10^{-M_U(\lambda)} \, d\lambda}{\int S_b(\lambda) \, d\lambda}\right) \quad (3f)$$

$$D_{ry} = -\log\left(\frac{\int S_r(\lambda) \, 10^{-Y_U(\lambda)} \, d\lambda}{\int S_r(\lambda) \, d\lambda}\right) \quad (3g)$$

$$D_{gy} = -\log\left(\frac{\int S_g(\lambda) \, 10^{-Y_U(\lambda)} \, d\lambda}{\int S_g(\lambda) \, d\lambda}\right) \quad (3h)$$

$$D_{by} = -\log\left(\frac{\int S_b(\lambda) \, 10^{-Y_U(\lambda)} \, d\lambda}{\int S_b(\lambda) \, d\lambda}\right) \quad (3i)$$

In the above equations, $S_r(\lambda)$, $S_g(\lambda)$ and $S_b(\lambda)$ are the spectral responses of the red, green and blue channels, respectively, of the scanner 10. Also, $D_{rc}$ is the red channel output density for a simulated film input of a unit cyan dye, $D_{gc}$ is the green channel output density for a simulated film input of a unit cyan dye and $D_{bc}$ is the blue channel output density for a simulated film input of a unit cyan dye. In like fashion, $D_{rm}$, $D_{gm}$ and $D_{bm}$ are the red, green and blue channel output densities, respectively, for a simulated film input of a unit magenta dye while $D_{ry}$, $D_{gy}$ and $D_{by}$ are the red, green and blue channel output densities, respectively, for a simulated film input of a unit yellow dye. These values are arranged in a 3×3 matrix as follows:

$$\begin{bmatrix} D_{rc} & D_{rm} & D_{ry} \\ D_{gc} & D_{gm} & D_{gy} \\ D_{bc} & D_{bm} & D_{by} \end{bmatrix}$$

This matrix, also referred to as a Z matrix, is inverted using a well-known mathematical technique to obtain the $Z^{-1}$ matrix 52.

It should be noted that, in the preferred embodiment, the functions noted above as well as the remaining functions described herein are sampled versions of the continuous signals and the integrals are approximated by summations over a suitable band of wavelengths, such as 400 nanometers to 700 nanometers.

The scanner color definition signals supplied to the matrix 52 are multiplied by such matrix. The resulting first set of colorant estimates are latched by the latch 60 and are provided to a noninverting input of the second summer 54. During this first pass through the loop, a noninverting input of the second summer 54 receives a triplet of zero values from the latch 62, and hence the output of the summer equals the output of the latch 60.

Figure 3:
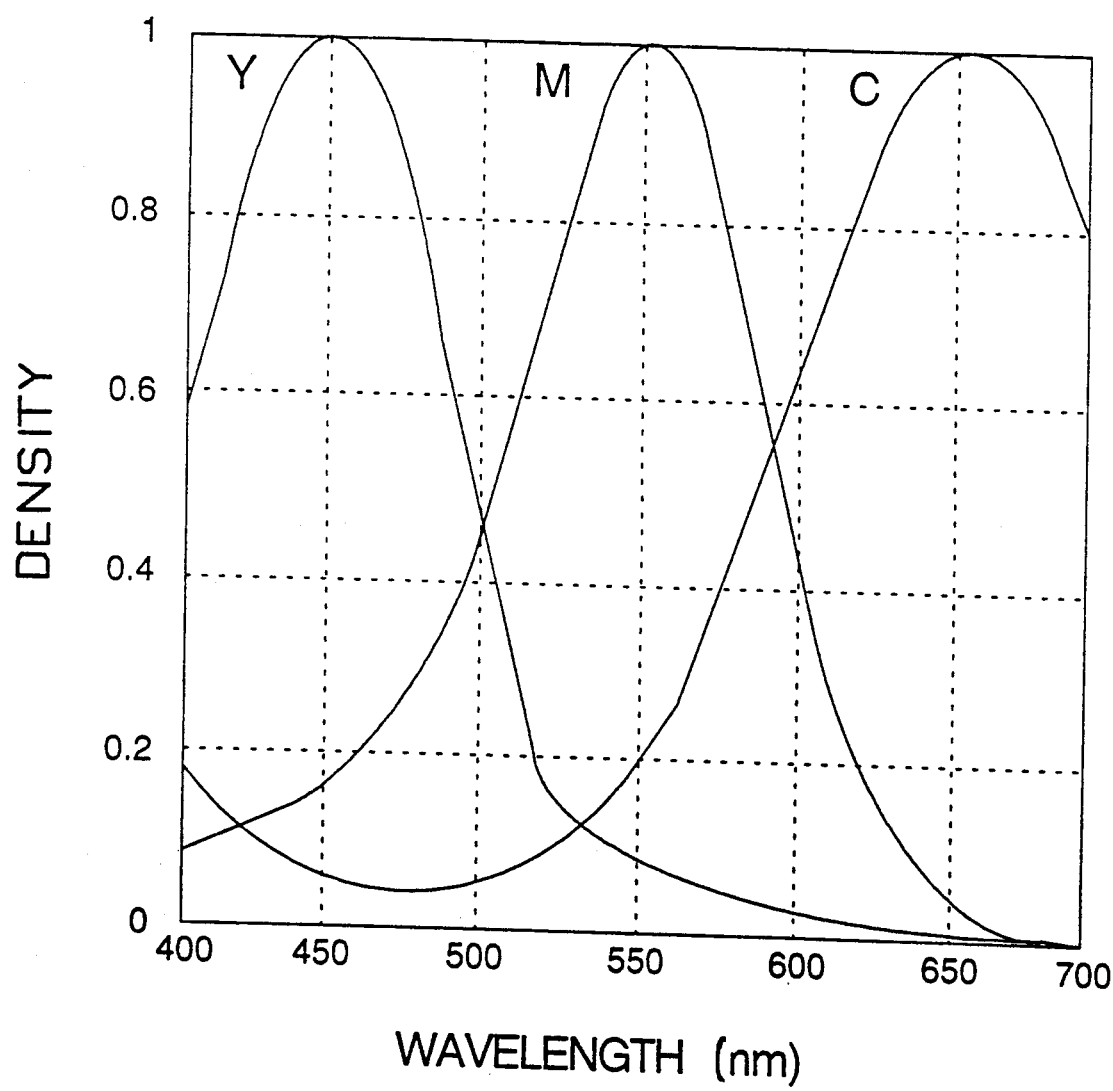
FIG. 3 comprises a series of curves illustrating the spectral densities of dyes used with a particular transparency film stock.

The first set of colorant estimates are passed by the summer 54 to the first simulation module 56. The module 56 simulates the reconstruction of the pixel color density spectrum defined by and associated with the first set of colorant estimates by solving equation (1) above using the known spectral density distribution of the film dyes. FIG. 3 is a series of curves illustrating the relative densities of the yellow, magenta and cyan film dyes as a function of wavelength for a typical film and represent the functions $C_U(\lambda)$, $M_U(\lambda)$ and $Y_U(\lambda)$ of equation (1). Once the density spectrum $D(\lambda)$ is found, the second simulation module 58 simulates scanning of the simulated reconstructed pixel color. This is accomplished by solving the following equations:

$$f_r(C,M,Y) = -\log\left(\frac{\int S_r(\lambda) \, 10^{-(CC_U(\lambda)+MM_U(\lambda)+YY_U(\lambda))} \, d\lambda}{\int S_r(\lambda) \, d\lambda}\right) \quad (4a)$$

$$f_g(C,M,Y) = -\log\left(\frac{\int S_g(\lambda) \, 10^{-(CC_U(\lambda)+MM_U(\lambda)+YY_U(\lambda))} \, d\lambda}{\int S_g(\lambda) \, d\lambda}\right) \quad (4b)$$

$$f_b(C,M,Y) = -\log\left(\frac{\int S_b(\lambda) \, 10^{-(CC_U(\lambda)+MM_U(\lambda)+YY_U(\lambda))} \, d\lambda}{\int S_b(\lambda) \, d\lambda}\right) \quad (4c)$$

where $f_r(C, M, Y)$, $f_g(C, M, Y)$ and $f_b(C, M, Y)$ are the simulated red, green and blue channel outputs, respectively, of the module 58 and $S_r(\lambda)$, $S_g(\lambda)$ and $S_b(\lambda)$ are the spectral responses noted above in connection with equations 3(a)–3(i).

The outputs of the module 58 comprise a first set of estimated color definition signals and are applied to the inverting input of the summer 50. The summer 50 compares or subtracts each channel of the first set of estimated color definition signals from the corresponding channel of the latched scanner signals to obtain a first set of error signals. This first set of error signals is processed by the $Z^{-1}$ matrix 52 and the resulting corrected set of error signals (also referred to as incremental colorant values or incremental dye values) are latched by the latch 60. These latched values are then added by the summer 54 to the first set of colorant estimates stored by the latch 62. The resulting further set of colorant estimates is supplied to the modules 56 and 58 which operate as before to simulate reproduction of the color associated with the set of colorant estimates and to simulate scanning of such reproduced color to develop a further triplet of estimated color definition signals. These further estimated color definition signals are subtracted from the latched scanner signals to develop a further set of error signals. These error signals are processed by the matrix 52 and are supplied by the latch 60 to the summer 54 to derive a still further set of colorant estimates. The foregoing process continues until a solution criterion is met. For example, the process may continue until the error signals produced by the first summer are equal to zero, when the magnitudes of the error signals fall below a certain level, when the speed of convergence toward the true result drops below a certain level or when the data has been processed by the loop a certain number of times. It has been found that seven iterations of the loop 40 is sufficient to reduce the errors to a sufficient degree, namely below the threshold of human sensitivity to color difference. Once a solution criterion has been met, the output of the summer 54 represents the colorant amounts or densities of the cyan, magenta and yellow film dyes required to substantially or exactly reproduce the pixel color. These signals are converted by the block 56 into density spectrum values that are supplied to the further latch 64. The latched density spectrum values are processed by an exponentiation module 66 to convert such values into transmittance spectral data. These data are multiplied by a block 68 with a curve representing the spectral content of a desired illuminant, typically D5000 for graphic arts applications. A block 70 then multiplies the output of the block 68 by the 1931 CIE Standard Observer Curves or any desired set of color matching functions. A block 72 thereafter integrates the resultant curves to obtain the colorimetric values X, Y and Z as follows:

$$X = \int \bar{x}(\lambda) \cdot S(\lambda) d\lambda \tag{5a}$$

$$Y = \int \bar{y}(\lambda) \cdot S(\lambda) d\lambda \tag{5b}$$

$$Z = \int \bar{z}(\lambda) \cdot S(\lambda) d\lambda \tag{5c}$$

where $\bar{x}(\lambda)$, $\bar{y}(\lambda)$, $\bar{z}(\lambda)$ are the color matchign functions (i.e., the 1931 CIE Standard Observer Curves) and $S(\lambda)$ is the output of the multiplication block 68 and represents the intensity spectrum of the pixel.

In order to load the LUT 44, each triplet of simulated scanner signals is processed by the iterative correction loop 40 until errors therein are reduced to a sufficient degree. At this point, the signal on the line 63 is processed by the circuits 64–72 to obtain colorimetric values which are stored in the LUT 44. As noted previously, the LUT 44 operates in conjunction with the interpolator 46 to obtain colorimetric values from scanner outputs. If desired, the values developed by the integrator 72 may first be passed to a circuit which calculates the negative logarithms or another reversible transformation of the colorimetric values and the resulting values may be stored instead as entries in the lookup table to facilitate interpolation by the interpolator 46. However, if, for example, the negative logarithms of the signals developed by the integrator 72 are stored in the LUT 44, then a circuit which exponentiates the output of the LUT 44 must be provided at the output thereof to convert the resulting values back to colorimetric data.

If necessary or desirable, the values developed by the integrator 72 may be converted from the XYZ or alternative color space to a different space, such as L*a*b* space, and interpolation may be performed within that space.

It should be noted that any suitable interpolation process may be implemented by the interpolator 46. For example, a conventional trilinear interpolation process may be effected by the interpolator 46, or a different interpolation process, such as that disclosed and claimed in Clark, et al., U.S. Pat. No. 4,477,833 may be used.

It should also be noted that when a LUT is employed, there will be some error introduced due to the fact that a significant number of table addresses represent impossible scanner outputs. As a result, use of any such address as one of the values in the interpolation process will create errors. These errors can be reduced by using a lookup table having a larger number of entries, for example 33 steps per color, although use of such a lookup table would probably result in a greater than required level of accuracy.

It can be see that by knowing the spectral bandpass of the scanner 10 and the dye density spectrum for the particular transparency film of the color original, one may utilize a successive approximation procedure to obtain signals representing an arbitrarily close or even exact estimate of the amounts of dyes required to reproduce a pixel color on a transparency. Such signals may then be converted to colorimetric data using the color matching functions.

The method of the present invention may be used to scan other types of color originals, such as reflective copy, utilizing a scanner or any other photosensitive device set up to detect the colors thereon. In fact, even a very poor densitometer or a photosensitive device other than a densitometer or scanner could be used to detect the pixel colors. In each case, the colorant amount signals developed by the summer 54 represent the amounts of colorants required to substantially or exactly reproduce the color of each pixel. In this case, the colorant density spectrum for the colorants and the medium on which the colorants are used must be known as well as the spectral bandpass of the photosensitive device. The signals developed by the summer 54 are then processed by a module like the module 56 to simulate reconstruction of the pixel color by the colorants on the medium and a module like the module 58 to simulate scanning of the simulated reproduced color by the scanner. Once a solution criterion has been met, the resulting signals developed by the summer 54 are once again processed by the module corresponding to the module 56 to obtain the density spectrum values that are later converted into colorimetric data.

It should further be noted that the iterative successive approximation procedure disclosed herein may be replaced by a different approximation procedure that converges upon a result, if desired. In fact, such an approximation procedure may not require the use of the $Z^{-1}$ matrix Also, different data developed by the blocks 40 and 42 may be stored in a LUT, such as the colorant amounts or densities developed by the summer 54, if desired.

While the method of the present invention requires knowledge of the spectral density of the film dyes or other colorants that are used to produce the color original, it is believed that this limitation is outweighed by the fact that colorimetric data may be found without requiring modification of existing scanner filters. Also, the method of the present invention could develop a different number of colorant densities for each pixel for those films or media that use other than three dyes or colorants.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A method of developing a set of colorant signals representing substantially exact amounts of colorants required to reproduce a color in a medium, comprising the steps of:

using a photosensitive device to develop a first set of color definition signals defining the color in terms of amounts of color components according to a transformation function;

processing the set of color definition signals in an iterative conversion loop wherein the loop develops a succession of sets of colorant estimates that converge toward the required exact amounts of colorants; and selecting a set of colorant estimates that meets a solution criterion as the set of colorant signals.

2. The method of claim 1, wherein the step of using a photosensitive device comprises the step of employing a scanner to detect the color.

3. The method of claim 1, wherein the step of using a photosensitive device comprises the step of employing a densitometer to detect the color.

4. The method of claim 1, wherein the step of processing includes the steps of deriving a first set of colorant estimates from the first set of color definition signals and incrementing the first set of colorant estimates in accordance with a succession of sets of error values to obtain further sets of colorant estimates.

5. The method of claim 4, wherein the step of deriving includes the step of modifying the first set of color definition signals in accordance with a matrix to obtain the first set of colorant estimates.

6. The method of claim 5, wherein the step of incrementing includes the further steps of converting each set of colorant estimates into a set of estimated color definition signals according to the transformation function, subtracting each set of estimated color definition signals from the first set of color definition signals to obtain the succession of sets of error values, converting the succession of sets of error values into successive sets of incremental colorant values and adding the successive sets of incremental colorant values to the first set of colorant values to obtain the sets of colorant estimates.

7. The method of claim 6, wherein the step of converting includes the step of modifying the succession of sets of error values in accordance with the matrix to obtain the successive sets of incremental color values.

8. The method of claim 6, wherein each set of colorant estimates represents an associated color and wherein the step of converting includes the steps of passing each set of colorant estimates to a first simulation module which converts each set of colorant estimates into density spectrum values representing the associated color in accordance with the spectral distribution of the colorants and a second simulation module which simulates scanning of the associated color by the densitometer to derive the estimated color definition signals.

9. The method of claim 8, including the further step of developing color data in a particular color space from the density spectrum values obtained by conversion of the selected set of colorant estimates.

10. The method of claim 9, wherein the step of developing comprises the step of converting the density spectrum values into colorimetric X, Y, Z data.

11. The method of claim 9, including the further step of storing the color data in a lookup table.

12. The method of claim 1, including the further step of storing the selected set of colorant estimates in a lookup table.

13. A method of converting a set of scanner signals produced by a scanner into a set of colorant signals wherein the scanner signals represent approximate densities of components of a color formed by a colorant on a medium, the method comprising the steps of:

(a) modifying the set of scanner signals a first time to obtain a first set of colorant estimates;

(b) simulating reproduction of the color on the medium using the first set of colorant estimates;

(c) simulating scanning of the simulated reproduced color by the scanner to obtain a first set of estimated color definition signals;

(d) comparing the first set of estimated color definition signals with the set of scanner signals to obtain a set of error signals;

(e) modifying the set of error signals to obtain a corrected set of error signals; and (f) summing the set of corrected error signals with the first set of colorant estimates to derive the set of colorant signals.

14. The method of claim 13, wherein the step (a) comprises the step of using a matrix to modify the set of scanner signals.

15. The method of claim 14, wherein the step (e) comprises the step of using the matrix to modify the error signals.

16. The method of claim 13, including the further step of obtaining density spectrum values representing an estimate of spectral content of the color from the set of colorant signals.

17. The method of claim 16, including the further step of converting the density spectrum values into color data in a particular color space.

18. The method of claim 17, including the further step of storing the color data in a lookup table.

19. The method of claim 17, wherein the step of converting comprises the step of transforming the density spectrum values into colorimetric data using color matching functions.

20. The method of claim 13, wherein the step (d) comprises the step of subtracting the first set of estimated color definition signals from scanner signals.

21. A method of converting color density data into colorimetric data wherein the color density data represent approximate densities of color components of a color formed by colorants on a medium and wherein the colorants have known spectral densities when applied to the medium, the method comprising the steps of:

correcting the color density data in an iterative conversion loop to obtain a set of colorant data representing amounts of each colorant forming the color on the medium; and converting the set of colorant data into colorimetric data using data representing the known spectral densities of the colorants and color matching functions.

22. The method of claim 21, wherein the step of correcting includes the steps of modifying the color density data in accordance with a correction matrix to obtain a first set of corrected colorant data, deriving a first set of error data from the first set of corrected colorant data, modifying the first set of error data to obtain summed data to obtain a first set of correction data and summing the first set of correction data with the first set of corrected colorant data to obtain a second set of corrected colorant data.

23. The method of claim 22, wherein the step of modifying the first set of error data comprises the step of using the correction matrix to obtain the first set of correction data from the first set of error data.

24. The method of claim 22, wherein the step of deriving includes the steps of using the first set of corrected colorant data to simulate reproduction of the color on the medium and simulating scanning of the simulated reproduction of the color by a scanner to obtain the first set of error data.

25. The method of claim 24, wherein the step of using the first set of corrected colorant data includes the step of obtaining density spectrum values representing an estimate of spectral content of the color from the first set of corrected colorant data and the data representing the known spectral densities of the colorants.

26. The method of claim 25, wherein color density data are produced by a scanner having spectral response elements including red, green and blue filters each having a transmittance spectral distribution and wherein the step of simulating scanning includes the step of combining the density spectrum values with data representing the transmittance spectral distributions of the filters to obtain the first set of error data.

27. The method of claim 21, including the further steps of scanning a plurality of discrete pixels of a color original to obtain a plurality of sets of color density data representing color components of pixel colors, correcting the plurality of sets of color density data in an iterative conversion loop to obtain a plurality of sets of colorant data representing amounts of each colorant which, if applied to the medium on a pixel-by-pixel basis, would substantially reproduce the pixel colors and converting the plurality of sets of colorant data into colorimetric data on a pixel-by-pixel basis using data representing the known spectral densities of the colorants and the color matching functions.

28. The method of claim 27, wherein the color original comprises a series of color patches spanning a color space and including the further steps of providing a lookup table, storing the colorimetric data in the lookup table and accessing the lookup table with subsequently-obtained color density data.

29. The method of claim 21, including the further steps of providing a plurality of sets of color density data representing a plurality of colors, correcting the sets of color density data in an iterative conversion loop to obtain sets of colorant data, converting the sets of colorant data into colorimetric data and storing the colorimetric data in a lookup table.

* * * * *

REEXAMINATION CERTIFICATE (2371st)

United States Patent [19]
Dunne et al.

[11] B1 5,149,960
[45] Certificate Issued Aug. 30, 1994

[54] METHOD OF CONVERTING SCANNER SIGNALS INTO COLORIMETRIC SIGNALS

[75] Inventors: Bruce Dunne, Westmont, Ill.; Thomas G. Stockham, Jr., Salt Lake City, Utah

[73] Assignee: R.R. Donnelley & Sons Company, Lisle, Ill.

Reexamination Request:
No. 90/003,304, Jan. 14, 1994

Reexamination Certificate for:
Patent No.: 5,149,960
Issued: Sep. 22, 1992
Appl. No.: 725,657
Filed: Jul. 3, 1991

[51] Int. Cl.$^5$ .............................................. G01J 3/46
[52] U.S. Cl. .................................... 250/226; 356/402
[58] Field of Search ..................... 250/226; 356/402; 358/80

[56] References Cited

U.S. PATENT DOCUMENTS

4,977,522  12/1990  David ................................. 364/526
4,992,963  2/1991   Funt et al. .......................... 364/526

OTHER PUBLICATIONS

Clanton E. Mancill, *Digital Color Image Restoration*, (1975) (Ph.D. dissertation, University of Southern California).

Noboru Ohta, *Fast Computing of Color Matching by Means of Matrix Representation*, (pts. 1-2), reprinted from, 10 Applied Optics 2183 (Sep. 1971), 62 J. Optical Soc'y. Am. 129 (Jan. 1972).

*Primary Examiner*—David C. Nelms

[57] ABSTRACT

A method of developing a set of colorant signals representing substantially exact amounts of colorants required to reproduce a color in a medium includes the steps of using a scanner to develop a first set of scanner signals, processing the set of scanner signals in an iterative conversion loop and selecting a set of colorant estimates developed by the iterative conversion loop that meets a solution criterion as the set of colorant signals. The colorant signals may thereafter be converted to colorimetric data by a converter.

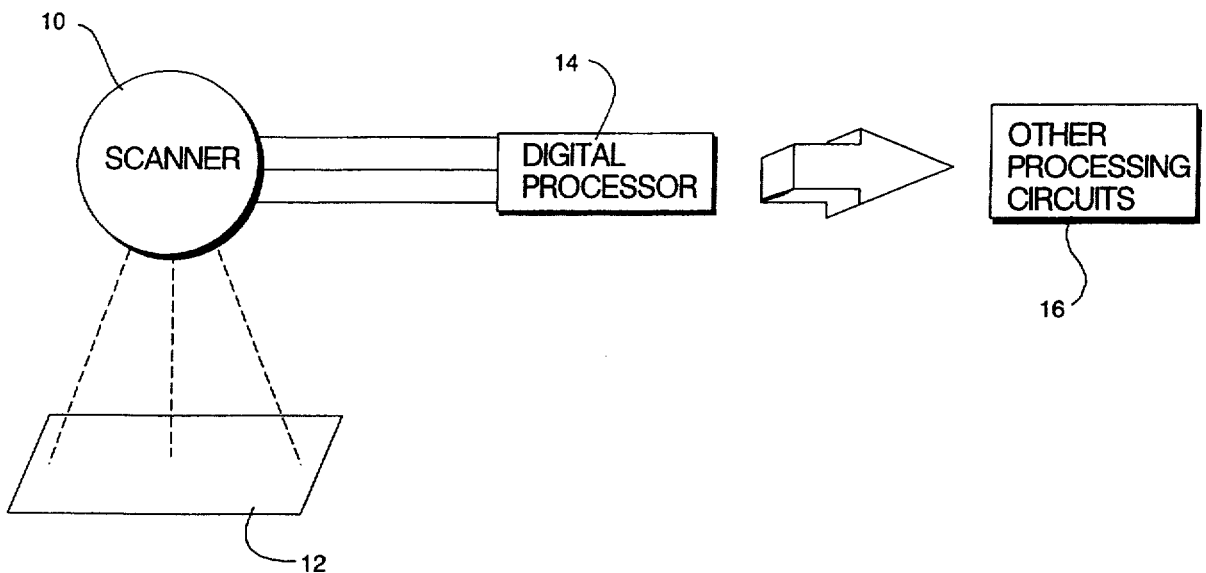

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13-29 is confirmed.

Claims 2 and 3 are cancelled.

Claims 1, 5 and 12 are determined to be patentable as amended.

Claims 4 and 6-11 dependent on an amended claim, are determined to be patentable.

1. A method of developing a set of colorant signals representing substantially exact amounts of colorants required to reproduce a color in a medium, comprising the steps of:
   using a [photosensitive device] *densitometer* to develop a first set of color definition signals defining the color in terms of amounts of color components according to a transformation function;
   processing the set of color definition signals in an iterative conversion loop wherein the loop develops a succession of sets of colorant estimates that converge toward the required exact amounts of colorants; and
   selecting a set of colorant estimates that meets a solution criterion as the set of colorant signals.

5. [The] *A* method of [claim 4,] *developing a set of colorant signals representing substantially exact amounts of colorants required to reproduce a color in a medium, comprising the steps of:*
   *using a photosensitive device to develop a first set of color definition signals defining the color in terms of amounts of color components according to a transformation function;*
   *processing the set of color definitioin signals in an iterative conversion loop wherein the loop develops a succession of sets of colorant estimates that converge toward the required exact amounts of colorants; and*
   *selecting a set of colorant estimates that meets a solution criterion as the set of colorant signals;*
   *wherein the step of processing includes the steps of driving a first set of colorant estimates from the first set of color definition signals and incrementing the first set of colorant estimates in accordance with a succession of sets of error values to obtain further sets of colorant estimates;*
   *and* wherein the step of deriving includes the step of modifying the first set of color definition signals in accordance with a matrix to obtain the first set of colorant estimates.

12. [The] *A* method of [claim 1, including the further step of] *developing a set of colorant signals representing substantially exact amounts of colorants required to reproduce a color in a medium, comprising the steps of:*
   *using a photosensitive device to develop a first set of color definition signals defining the color in terms of amounts of color components according to a transformation function;*
   *processing the set of color definition signals in an iterative conversion loop wherein the loop develops a succession of sets of colorant estimates that converge toward the required exact amounts of colorants;*
   *selecting a set of colorant estimates that meets a solution criterion as the set of colorant signals; and*
   storing the selected set of colorant estimates in a lookup table.

* * * * *